United States Patent [19] [11] Patent Number: 4,859,044
Kouchiwa [45] Date of Patent: Aug. 22, 1989

[54] LARGE APERTURE LENS SYSTEM FOR USE IN A COPIER

[75] Inventor: Taira Kouchiwa, Kamakura, Japan

[73] Assignee: Ricoh Company, Ltd., Tokyo, Japan

[21] Appl. No.: 149,587

[22] Filed: Jan. 28, 1988

[30] Foreign Application Priority Data

Jan. 29, 1987 [JP] Japan .................................. 62-17221

[51] Int. Cl.$^4$ .............................................. G02B 9/62
[52] U.S. Cl. .................................................. 350/464
[58] Field of Search ....................................... 350/464

[56] References Cited

U.S. PATENT DOCUMENTS

4,345,823  8/1982  Shinohara ........................... 350/464
4,690,518  9/1987  Kouchiwa et al. .................. 350/464
4,711,536 12/1987  Kouchiwa ........................... 350/476

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A copier lens system having a large aperture has a basic structure of 6-unit-6-element arrangement which is constructed by separating the first and second lenses of the orthmeta type lens system.

3 Claims, 11 Drawing Sheets

Fig. 1

LARGE APERTURE LENS SYSTEM FOR USE IN A COPIER

BACKGROUND OF THE INVENTION

1. Field of the Invention

This invention generally relates to a lens system for use in a copier, and, in particular, to a large aperture lens system for use in a copier, having a symmetrical arrangement with respect to a stop.

2. Description of the Prior Art

Recently, demands for high-speed operation and reproduction of high quality images for copiers are rising in addition to compactness in the overall size. As a result, a lens system of a copier is required to satisfy new demands. That is, for a high-speed reproduction operation, a light or bright lens system is required; however, if a lens system is designed to be lighter, its outer diameter becomes larger, which hinders to make the overall size of a copier compact in size. In this case, however, the disadvantages of the lens outer diameter becoming larger may be cancelled to some extent by making the total length of a lens system shorter. Regarding the demand for a high quality image reproduction, although it also depends on the image forming characteristic of a lens system and also on the developing characteristic, a recent trend in an increase in making copies from copies and also in an increase in the kinds of originals, e.g., printed matter, hand-written matter and pictures, must also be taken into account. Under the circumstances, it is necessary to provide a lens system capable of maintaining high MTF from its optical axis to its surrounding and having a large depth of field. In addition, such a lens system is required to have a high contrast from a low frequency to a high frequency.

In general, for use in copiers, printers or the like, a lens system having a completely symmetrical arrangement with respect to its stop is recommended. For example, Japanese Patent Post-examination Pub. No. 51-10091 discloses such a lens system having a six group and six element structure. In the copier lens system disclosed in this publication, there is obtained a sufficient level of brightness and a sufficient aperture efficiency; however, since the curvature of a radial image plane is relatively large, there is a disadvantage of incapability to maintain the flatness of an image plane to the edge portion of a field angle in use. In addition, a similar type copier lens system is disclosed in Japanese Patent Post-examination Pub. No. 61-9609, in which case, there is obtained a high contrast for high frequencies, but the coma flare is relatively large, so that there is a disadvantage of low contrast for low frequencies off the optical axis.

SUMMARY OF THE INVENTION

It is therefore a primary object of the present invention to obviate the disadvantages of the prior art and to provide an improved lens system suitable for use in copiers, printers or the like.

Another object of the present invention is to provide an improved copier lens system having a symmetrical arrangement of elements with respect to its stop.

A further object of the present invention is to provide an improved lens system high in performance, compact in size, simple in structure, and, thus, easy to manufacture.

A still further object of the present invention is to provide an improved lens system having a six unit and six element basic structure.

A still further object of the present invention is to provide an improved copier lens system having a large aperture without large curvature of a radial image plane and with the coma flare eliminated.

Other objects, advantages and novel features of the present invention will become apparent from the following detailed description of the invention when considered in conjunction with the accompanying drawings.

DESCRIPTION OF THE PREFERRED EMBODIMENTS

In accordance with the principle of the present invention, there is provided a lens system suitable for use in a copier, comprising in combination as arranged in the order mentioned from an object field side: a first positive lens in the form of a meniscus with its convex surface directed to the object field side; a second negative lens in the form of a meniscus with its convex surface directed to the object field side; a third positive lens in the form of a meniscus with its convex surface directed to the object field side; a stop; a fourth positive lens in the form of a meniscus, which has its concave surface directed to the object field side and which is substantially identical to said third lens; a fifth negative lens in the form of a meniscus, which has its concave surface directed to the object field side and which is substantially identical to said second lens; and a sixth positive lens in the form of a meniscus, which has its concave surface directed to the object field side and which is substantially identical to said first lens. Thus, the present lens system has a six unit and six element basic structure which is symmetrical with respect to its stop.

In addition, the present lens system is so structured to satisfy the following conditions.

$$0.28 < \frac{d_1 + d_2 + d_3}{z} < 0.34 \quad (1)$$

$$0.7 < \frac{r_2}{r_3} < 1.2 \quad (2)$$

$$-17 < \frac{f_{12}}{f} < -4.5 \quad (3)$$

$$1.7 < n_1 < 1.8 \quad (4)$$

$$\nu_2 < 35$$

$$1.68 < n_3 < 1.73$$

$$50 < \nu_3$$

where,
f: combined focal distance of the total system;
$f_{12}$: combined focal distance of the first (=sixth) and the second (=fifth) lenses;
$r_2$: radius of curvature of the second surface (=eleventh surface) from the object field side;
$r_3$: radius of curvature of the third surface (=tenth surface) from the object field side;
$d_1+d_2+d_3$: sum of the center lens thicknesses of the first lens (=sixth lens) and the second lens (=fifth lens) and the center air gap between the first (=sixth) and second (= fifth) lenses;
z: total sum of the center lens thicknesses of the entire system;
$n_1$: refractive index of the first (=sixth) lens;
$\nu_2$: Abbe number of the second (=fifth) lens;
$n_3$: refractive index of the third (=fourth) lens:
$\nu_3$: Abbe number of the third (=fourth) lens.

Figure 1:
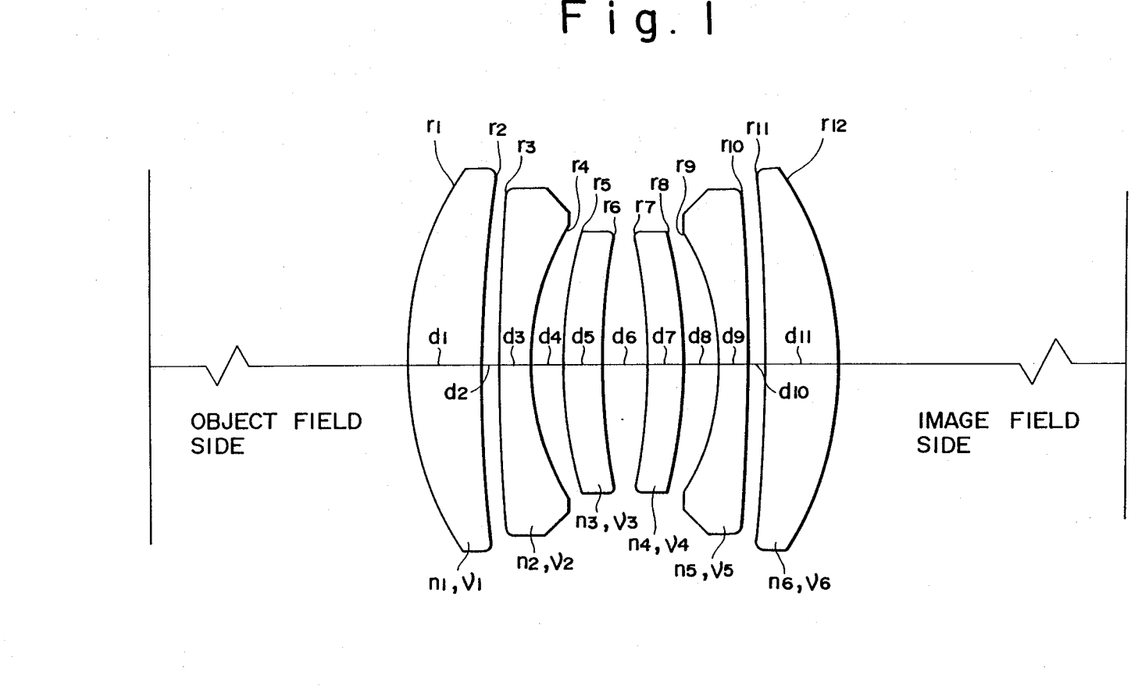
FIG. 1 is a schematic illustration showing the overall structure of a lens system constructed in accordance with the principle of the present invention.
Figure 2A:
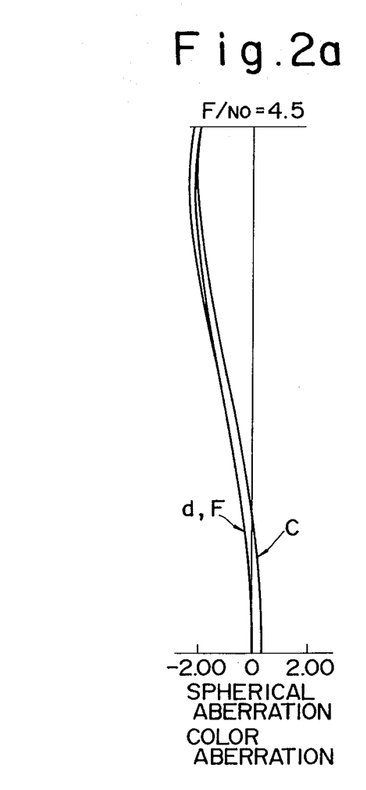
FIGS. 2a through 2d are graphs showing the various aberration curves of a first embodiment of the present lens system.
Figure 2B:
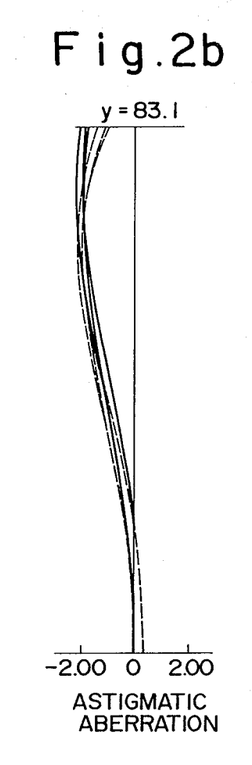
Figure 2C:
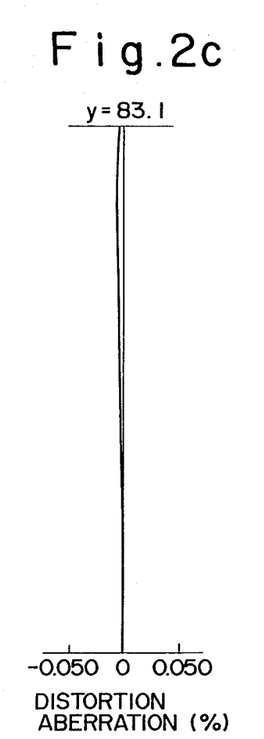
Figure 2D:
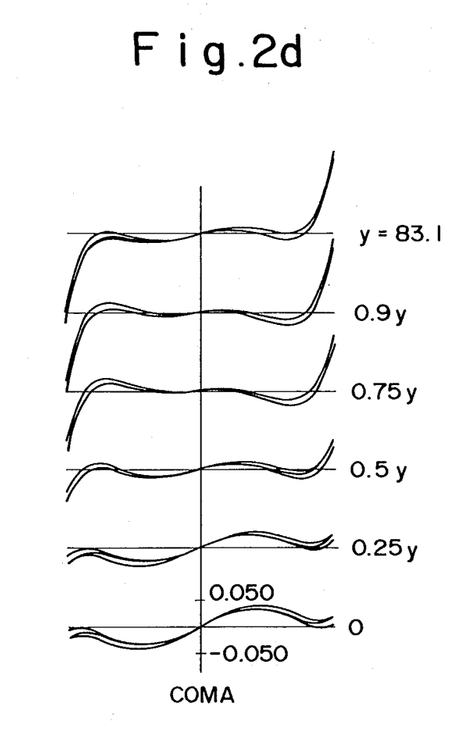
Figure 3:
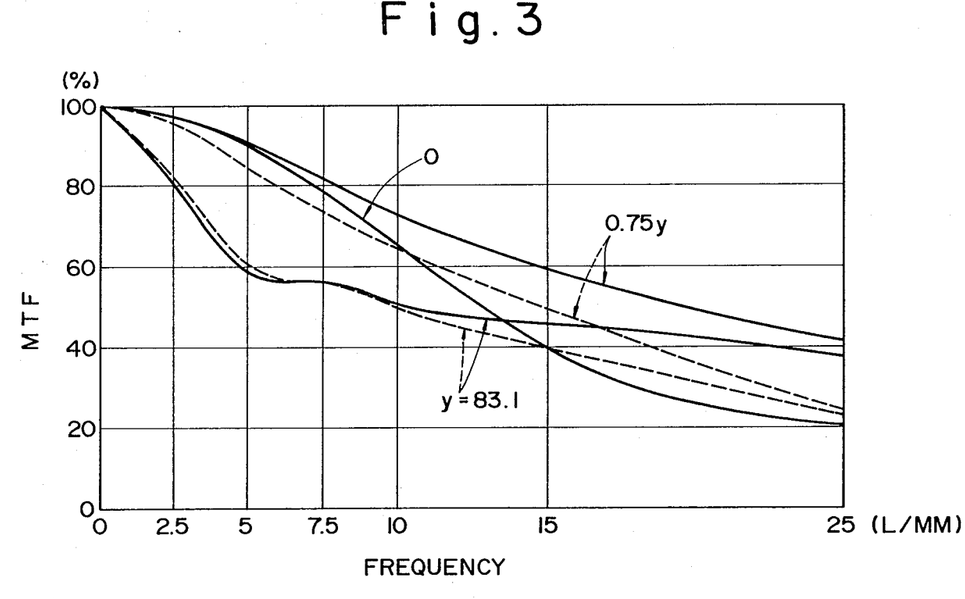
FIG. 3 is a graph showing the MTF curves of the first embodiment of the present lens system.
Figure 4A:
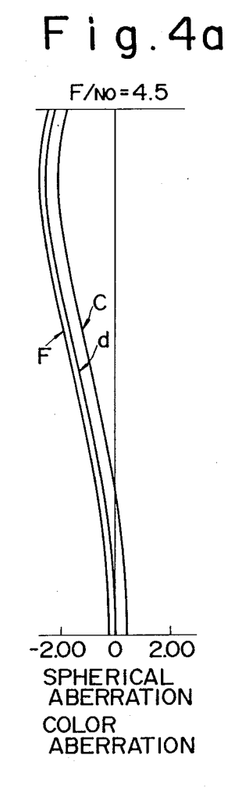
FIGS. 4a through 4d are graphs showing the various aberration curves of a second embodiment of the present lens system.
Figure 4B:
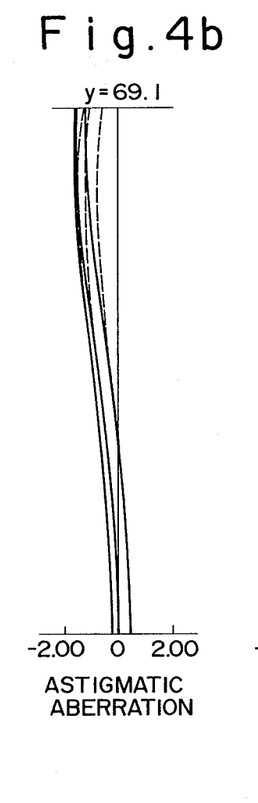
Figure 4C:
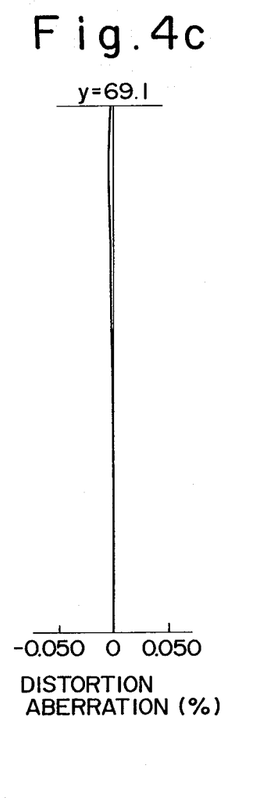
Figure 4D:
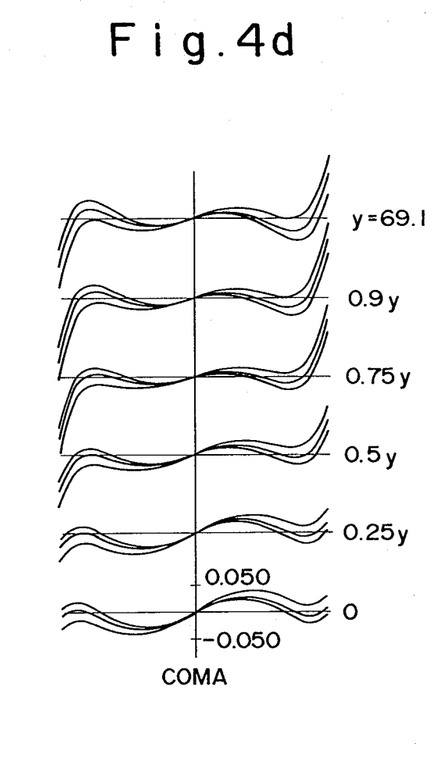
Figure 5:
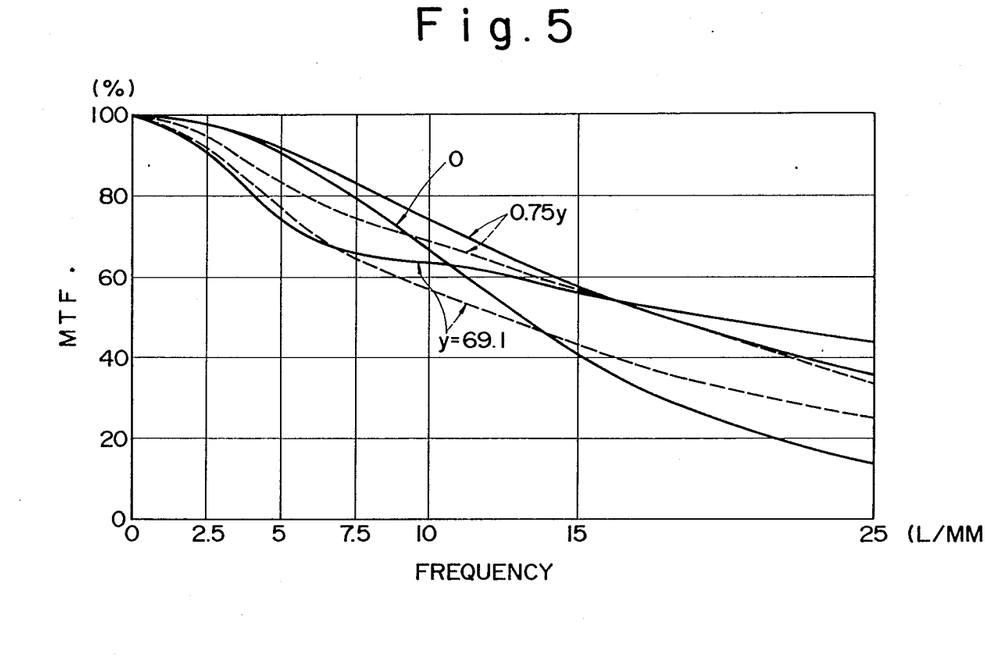
FIG. 5 is a graph showing the MTF curves of the second embodiment of the present lens system.
Figure 6A:
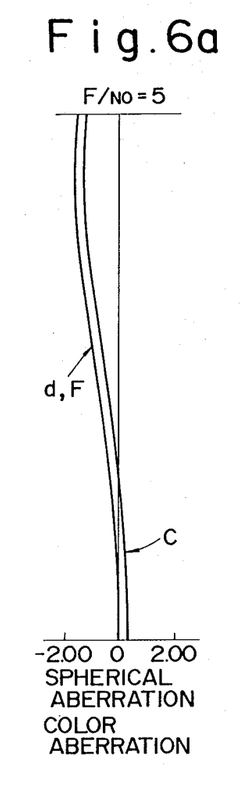
FIGS. 6a through 6d are graphs showing the various aberration curves of a third embodiment of the present lens system.
Figure 6B:
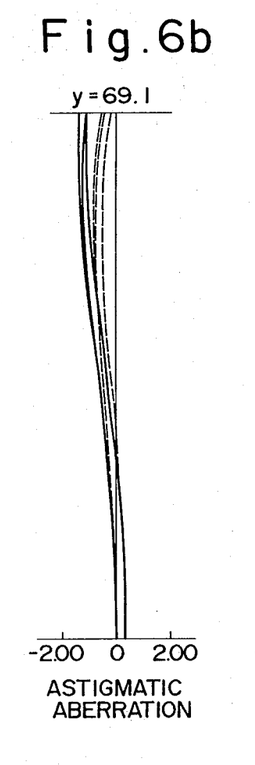
Figure 6C:
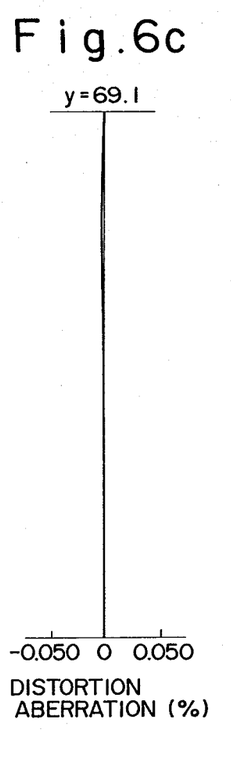
Figure 6D:
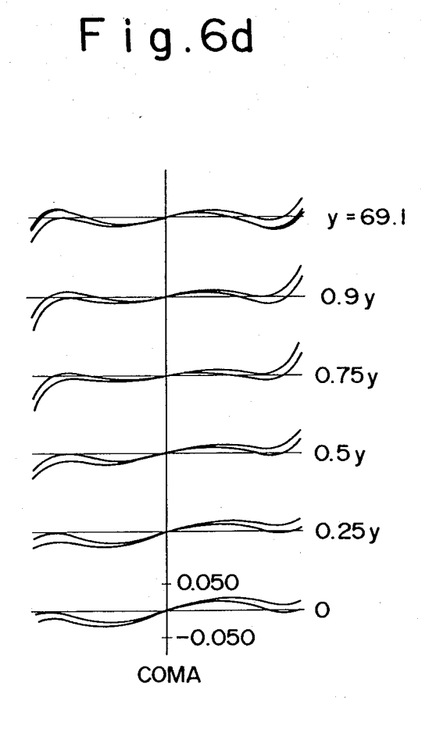
Figure 7:
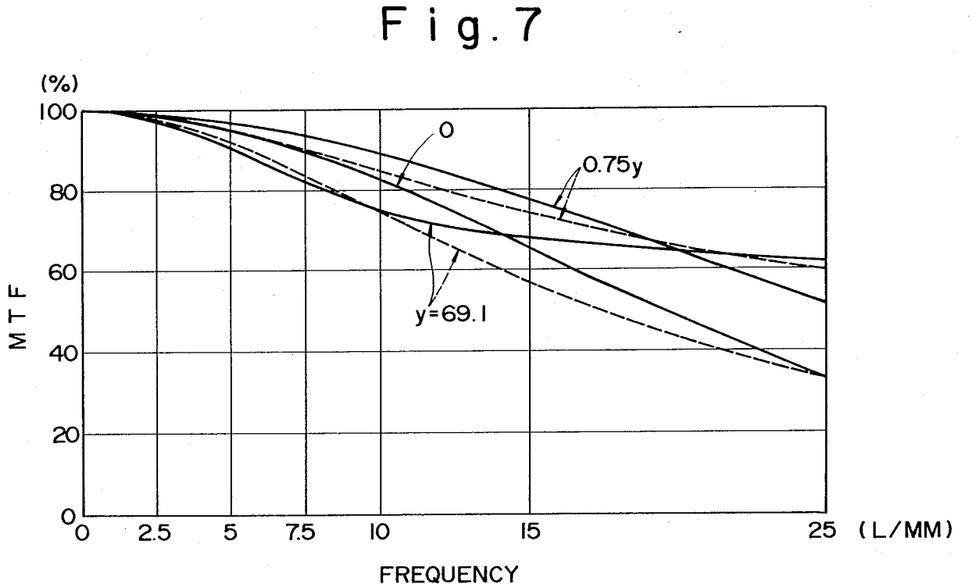
FIG. 7 is a graph showing the MTF curves of the third embodiment of the present lens system.
Figure 8A:
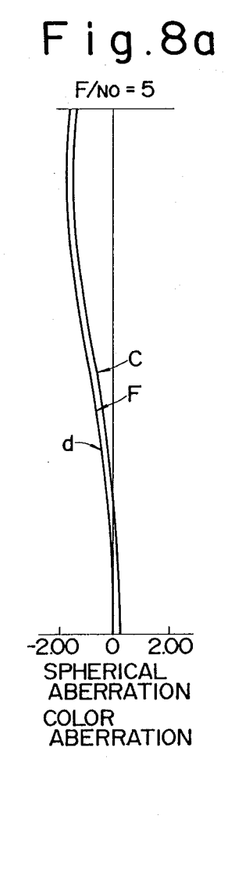
FIGS. 8a through 8d are graphs showing the various aberration curves of a fourth embodiment of the present lens system.
Figure 8B:
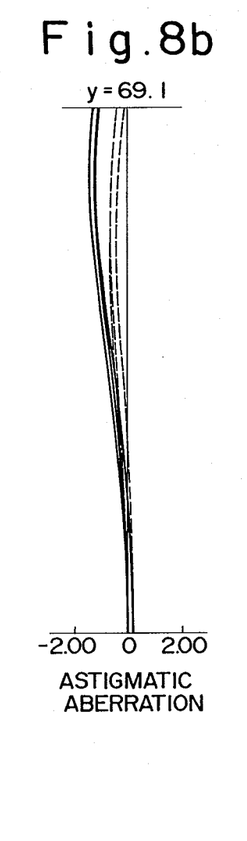
Figure 8C:
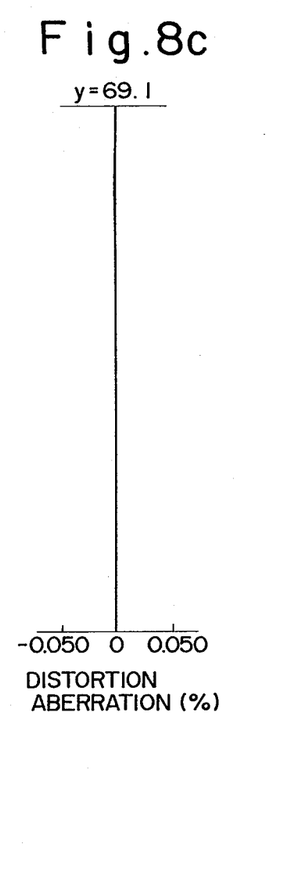
Figure 8D:
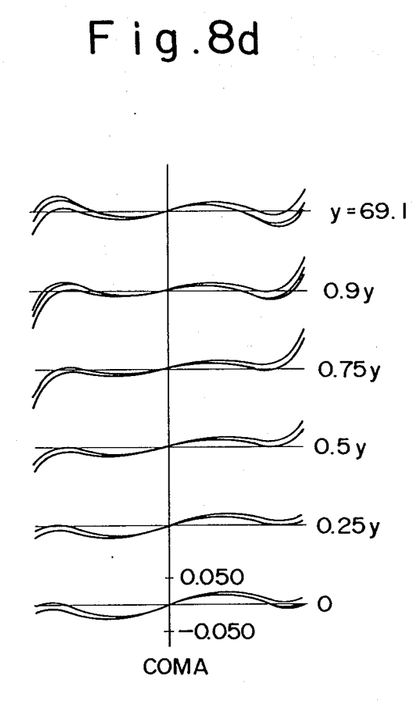
Figure 9:
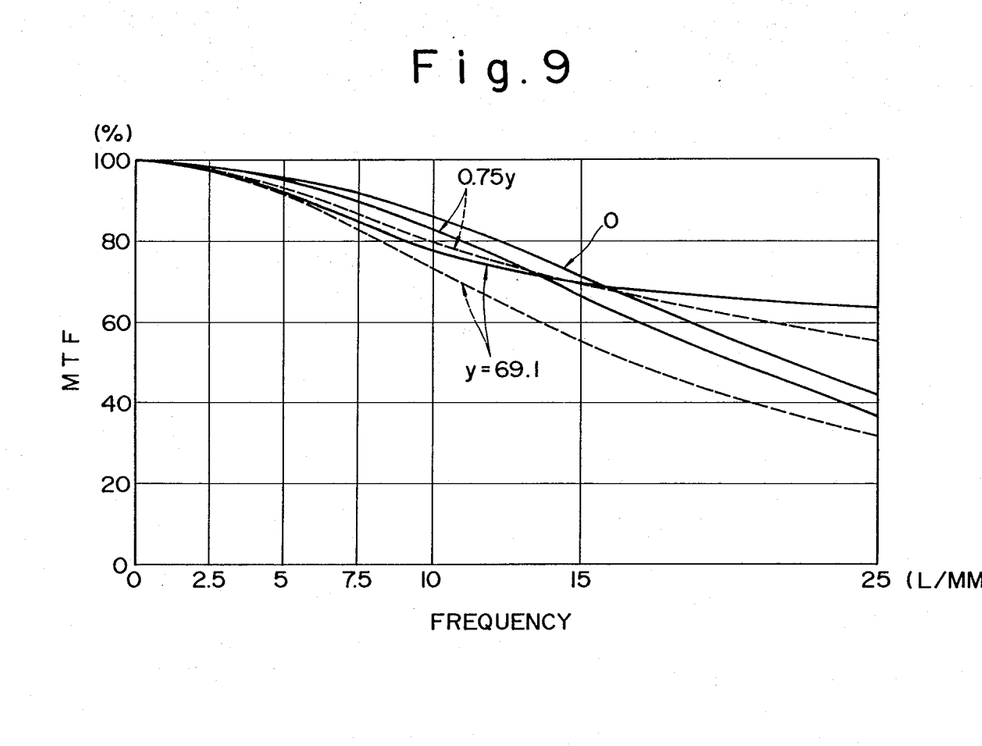
FIG. 9 is a graph showing the MTF curves of the fourth embodiment of the present lens system.
Figure 10A:
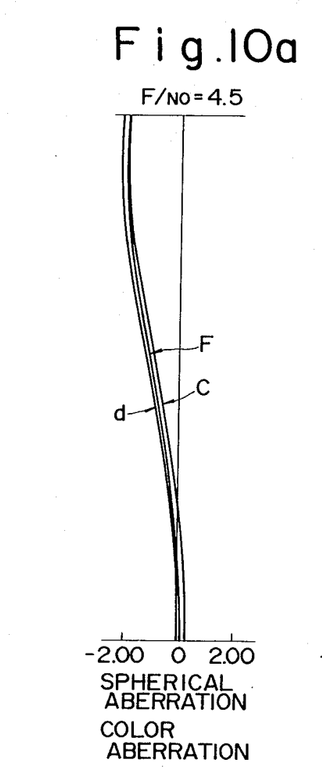
FIGS. 10a through 10d are graphs showing the various aberration curves of a fifth embodiment of the present lens system.
Figure 10B:
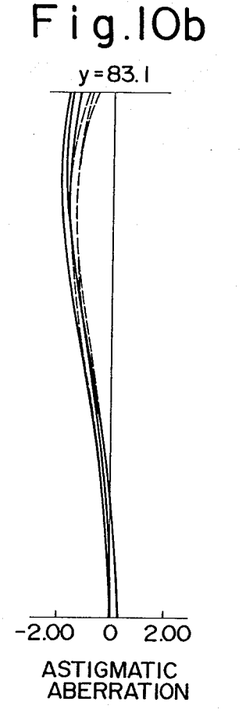
Figure 10C:
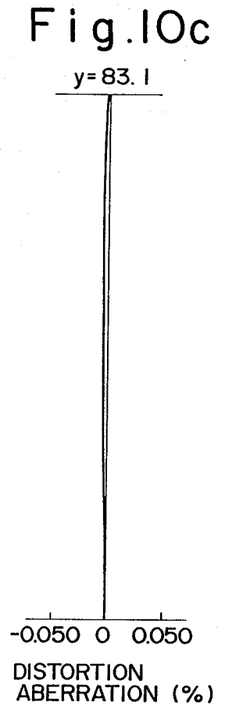
Figure 10D:
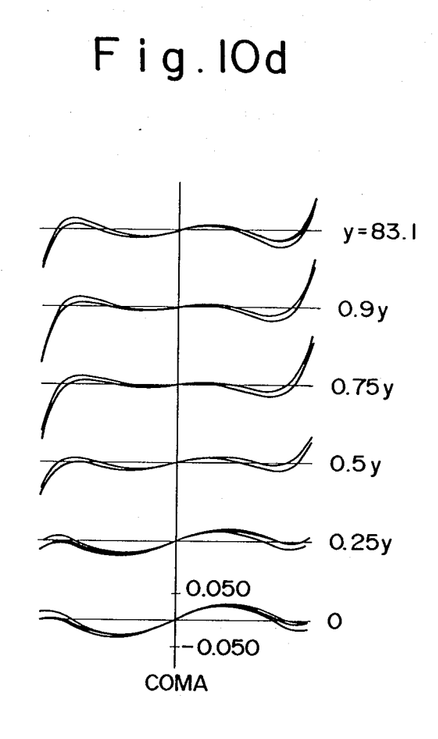
Figure 11:
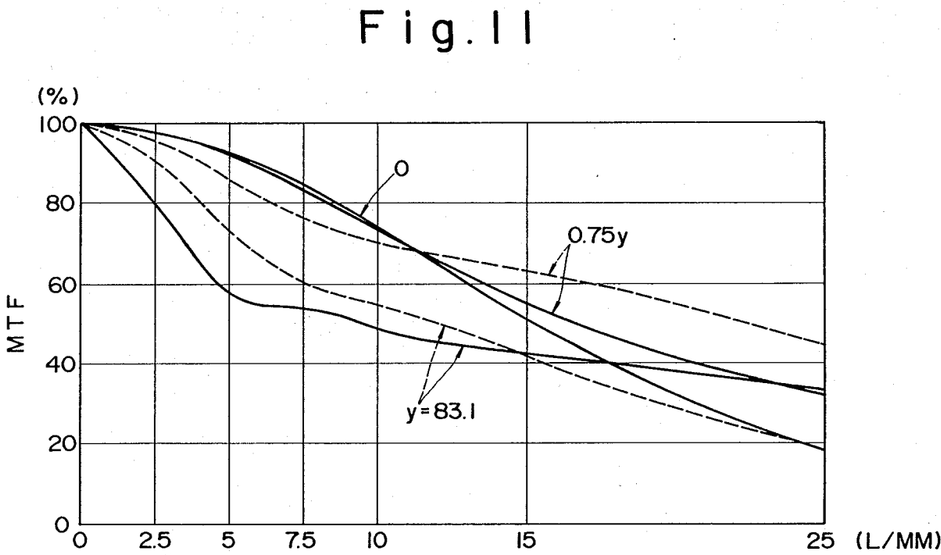
FIG. 11 is a graph showing the MTF curves of the fifth embodiment of the present lens system.

As shown in FIG. 1, the basic structure of the present lens system has a 6-unit-6-element arrangement which is constructed by separating the first and second lenses of the orthometa type structure so as to satisfy the above-described conditions (1) through (4). The condition (1) is a condition which is required to increase the contrast at low frequencies, which is one object of the present invention. When deviated from this condition, the coma flare of the coma aberration shown, for example, in each of FIGS. 2, 4, 6, 8 and 10, increases so that the contrast at low frequencies decreases. The condition (2) is a condition which is required to make an image plane flat assuming that the condition (1) has been satisfied. If the lower limit of this condition (2) is exceeded, the image plane experiences over correction; whereas, if the upper limit is exceeded, the image plane suffers from under correction, so that, in either case, the flatness of the image plane is lost to thereby cause the available field angle to be narrower.

On the other hand, the condition (3) constitutes one of the conditions which determines the performance of the lens type of the present invention, and it is a condition for maintaining a balance in the spherical aberration, which determines the performance on the optical axis, and the astigmatic aberration, which determines the performance off the optical axis. If either one of the upper and lower limits is exceeded, a balance between the spherical and astigmatic aberrations is lost, which results is a loss of flatness in an image plane, thereby causing the available field angle to be narrower. The condition (4) is a condition for correcting the longitudinal chromatic aberration and the chromatic aberration on an image plane, thereby allowing to use the lens system for the entire frequency range of visible light. If this condition is not satisfied, the available frequency range becomes narrower.

In what follows, a few specific examples of the present invention will be described. It is to be noted that the number of each example corresponds to the number of each of the embodiments whose aberration and MTF curves are illustrated in the drawings. In the description which follows, the following nomenclature will be used.

$r_1, \ldots, r_{12}$:
radius of curvature of each refracting surface in the order from the object field side;
$d_1, \ldots, d_{11}$:
spacing between adjacent refracting surfaces in the order from the object field side;
$n_1, \ldots, n_6$:
refractive index of each lens in the order from the object field side;
$\nu_1, \ldots, \nu_6$:
Abbe number of each lens in the order from the object field side;
f:
combined focal distance of the entire lens system;
F/No:
brightness of the lens system;
y:
image height; and
m:
magnification.

EXAMPLE 1

| | f = 100 y = 83.1 | | F/NO = 4.5 m = 1.0 | |
|---|---|---|---|---|
| | $r_i$ | $d_i$ | $n_i$ | $\nu_i$ |
| 1 | 30.596 | 5.636 | 1.78590 | 44.2 |
| 2 | 117.574 | 0.431 | | |
| 3 | 157.028 | 3.372 | 1.64769 | 33.8 |
| 4 | 23.391 | 2.287 | | |
| 5 | 36.434 | 2.545 | 1.69350 | 50.81 |
| 6 | 59.491 | 5.086 | | |
| 7 (= −6) | −59.491 | 2.545 | 1.69350 | 50.81 |
| 8 (= −5) | −36.434 | 2.287 | | |
| 9 (= −4) | −23.391 | 3.372 | 1.64769 | 33.8 |
| 10 (= −3) | −157.028 | 0.431 | | |
| 11 (= −2) | −117.574 | 5.636 | 1.78590 | 44.2 |
| 12 (= −1) | −30.596 | | | |

$$\frac{d_1 + d_2 + d_3}{z} = 0.2807 \quad n_1 = 1.78590$$

$$\frac{r_2}{r_3} = 0.7487 \quad \nu_2 = 33.8$$

$$\frac{f_{12}}{f} = -16.8892 \quad n_3 = 1.69350$$

$$\nu_3 = 50.81$$

EXAMPLE 2

| | f = 100.004 y = 69.1 | | F/NO = 4.5 m = 1.0 | |
|---|---|---|---|---|
| | $r_i$ | $d_i$ | $n_i$ | $\nu_i$ |
| 1 | 31.308 | 5.915 | 1.74400 | 44.71 |
| 2 | 119.698 | 1.816 | | |
| 3 | 101.068 | 3.004 | 1.64769 | 33.8 |
| 4 | 21.797 | 1.956 | | |
| 5 | 28.839 | 2.538 | 1.72000 | 50.24 |
| 6 | 43.17 | 2.05 | | |
| 7 (= −6) | −43.17 | 2.538 | 1.72000 | 50.24 |
| 8 (= −5) | −28.839 | 1.956 | | |
| 9 (= −4) | −21.797 | 3.004 | 1.64769 | 33.8 |
| 10 (= −3) | −101.068 | 1.816 | | |

-continued

| | $r_i$ | $d_i$ | $n_i$ | $\nu_i$ |
|---|---|---|---|---|
| | f = 100.004 | | F/NO = 4.5 | |
| | y = 69.1 | | m = 1.0 | |
| 11 (= −2) | −119.698 | 5.915 | 1.74400 | 44.71 |
| 12 (= −1) | −31.308 | | | |

$$\frac{d_1 + d_2 + d_3}{z} = 0.3302 \qquad n_1 = 1.74400$$

$$\frac{r_2}{r_3} = 1.1843 \qquad \nu_2 = 33.8$$

$$\qquad n_3 = 1.72000$$

$$\frac{f_{12}}{f} = -7.5243 \qquad \nu_3 = 50.24$$

EXAMPLE 3

| | $r_i$ | $d_i$ | $n_i$ | $\nu_i$ |
|---|---|---|---|---|
| | f = 99.985 | | F/NO = 5 | |
| | y = 69.1 | | m = 1.0 | |
| 1 | 30.833 | 4.861 | 1.74400 | 44.71 |
| 2 | 134.634 | 3.152 | | |
| 3 | 138.334 | 2.222 | 1.64769 | 33.8 |
| 4 | 22.276 | 2.406 | | |
| 5 | 31.524 | 2.883 | 1.72000 | 50.24 |
| 6 | 50.061 | 1.352 | | |
| 7 (= −6) | −50.061 | 2.883 | 1.72000 | 50.24 |
| 8 (= −5) | −31.524 | 2.406 | | |
| 9 (= −4) | −22.276 | 2.222 | 1.64769 | 33.8 |
| 10 (= −3) | −138.334 | 3.152 | | |
| 11 (= −2) | −134.634 | 4.861 | 1.74400 | 44.71 |
| 12 (= −1) | −30.833 | | | |

$$\frac{d_1 + d_2 + d_3}{z} = 0.3159 \qquad n_1 = 1.74400$$

$$\frac{\nu_2}{r_3} = 0.9733 \qquad \nu_2 = 33.8$$

$$\qquad n_3 = 1.72000$$

$$\frac{f_{12}}{f} = -7.0726 \qquad \nu_3 = 50.24$$

EXAMPLE 4

| | $r_i$ | $d_i$ | $n_i$ | $\nu_i$ |
|---|---|---|---|---|
| | f = 99.997 | | F/NO = 5 | |
| | y = 69.1 | | m = 1.0 | |
| 1 | 30.817 | 5.051 | 1.72000 | 43.69 |
| 2 | 232.913 | 3.429 | | |
| 3 | 271.098 | 2.132 | 1.64769 | 33.8 |
| 4 | 21.966 | 2.016 | | |
| 5 | 30.122 | 2.827 | 1.69350 | 50.81 |
| 6 | 50.744 | 1.298 | | |
| 7 (= −6) | −50.744 | 2.827 | 1.69350 | 50.81 |
| 8 (= −5) | −30.122 | 2.016 | | |
| 9 (= −4) | −21.966 | 2.132 | 1.64769 | 33.8 |
| 10 (= −3) | −271.098 | 3.429 | | |
| 11 (= −2) | −232.913 | 5.051 | 1.72000 | 43.69 |
| 12 (= −1) | −30.817 | | | |

$$\frac{d_1 + d_2 + d_3}{z} = 0.3295 \qquad n_1 = 1.72000$$

$$\frac{r_2}{r_3} = 0.8591 \qquad \nu_2 = 33.8$$

$$\qquad n_3 = 1.69350$$

$$\frac{f_{12}}{f} = -5.0257 \qquad \nu_3 = 50.81$$

EXAMPLE 5

| | $r_i$ | $d_i$ | $n_i$ | $\nu_i$ |
|---|---|---|---|---|
| | f = 100.004 | | F/NO = 4.5 | |
| | y = 83.1 | | m = 1.0 | |
| 1 | 30.653 | 6.292 | 1.74400 | 44.71 |
| 2 | 151.537 | 1.496 | | |
| 3 | 194.16 | 2.647 | 1.64769 | 33.8 |
| 4 | 23.21 | 2.647 | | |
| 5 | 36.131 | 3.261 | 1.72000 | 50.24 |
| 6 | 59.848 | 2.3 | | |
| 7 (= −6) | −59.848 | 3.261 | 1.72000 | 50.24 |
| 8 (= −5) | −36.131 | 2.647 | | |
| 9 (= −4) | −23.21 | 2.647 | 1.64769 | 33.8 |
| 10 (= −3) | −194.16 | 1.496 | | |
| 11 (= −2) | −151.537 | 6.292 | 1.74400 | 44.71 |
| 12 (= =1) | −30.653 | | | |

$$\frac{d_1 + d_2 + d_3}{z} = 0.29 \qquad n_1 = 1.74400$$

$$\frac{r_2}{r_3} = 0.7805 \qquad \nu_2 = 33.8$$

$$\qquad n_3 = 1.72000$$

$$\frac{f_{12}}{f} = -11.3687 \qquad \nu_3 = 50.24$$

FIGS. 2a through 2d and 3 show the various aberration and MTF curves for example 1. Similarly, FIGS. 4a through 4d and 5, 6a through 6d and 7, 8a through 8d and 9, and 10a through 10d and 11, show the various aberration and MTF curves for examples 2, 3, 4 and 5, respectively. In these figures, d and c indicates d and c lines, respectively, and F indicates an F line. In addition, the solid lines in the astigmatic aberration and MTF graphs indicate radial characteristics and the dotted lines in these graphs indicate tangential characteristics.

As described above, in accordance with the principle of the present invention, a lens system is structured to have a 6-unit-6-element arrangement by separating the first and second lenses in the orthometa type lens structure and to satisfy the four conditions (1) through (4) described above. With this structure, the curvature of a radial image plane may be minimized so that aberration correction may be effected from the center of an image surface to the peripheral portion thereof in an excellent manner. The resulting MTF curves, which can be used for evaluation of aberration correction, do indicate sufficiently high values up to high frequencies. In addition, in accordance with the present invention, since the coma flare can be eliminated, a high contrast can be obtained at low frequencies. Besides, since the total length of the lens system can be made shorter in the order of 0.322–0.36 times of its focal distance, the lens outer diameter can be made smaller even if it has a large aperture.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A lens system comprising in combination as arranged in the order mentioned from an object field side:
   a first positive lens having a convex surface directed to the object field side;

a second negative lens having a convex surface directed to the object field side;
a third positive lens having a convex surface directed to the object field side;
a stop;
a fourth positive lens having a concave surface directed to the object field side and substantially identical to said third lens;
a fifth negative lens having a concave surface directed to the object field side and substantially identical to said second lens; and
a sixth positive lens having a concave surface directed to the object field side and substantially identical to said first lens, each of said first through sixth lenses being a meniscus lens, whereby said lens system is structured to satisfy the following conditions:

$$0.28 < \frac{d_1 + d_2 + d_3}{z} < 0.34$$

$$0.7 < \frac{r_2}{r_3} < 1.2$$

$$-17 < \frac{f_{12}}{f} < -4.5$$

$1.7 < n_1 < 1.8$
$v_2 < 35$
$1.68 < n_3 < 1.73$
$50 < v_3$ where,
f: combined focal distance of the entire system;
$f_{12}$: combined focal distance of the first (=sixth) and the second (=fifth) lenses;
$r_2$: radius of curvature of a second surface (=eleventh surface) from the object field side;
$r_3$: radius of curvature of a third surface (=tenth surface) from the object field side;
$d_1 + d_2 + d_3$: sum of the center lens thicknesses of the first lens (=sixth lens) and the second lens (=fifth lens) and the center air gap between the first (=sixth) and second (=fifth) lenses;
z: total sum of the center lens thicknesses of the entire system;
$n_1$: refractive index of the first (=sixth) lens;
$v_2$: Abbe number of the second (=fifth) lens;
$n_3$: refractive index of the third (=fourth) lens:
$v_3$: Abbe number of the third (=fourth) lens.

2. The lens system of claim 1, wherein the arrangement of said first through sixth lenses is symmetrical with respect to said stop.

3. A lens system in a copier comprising in combination as arranged in the order mentioned from an object field side:
a first positive lens having a convex surface directed to the object field side;
a second negative lens having a convex surface directed to the object field side;
a third positive lens having a convex surface directed to the object field side;
a stop;
a fourth positive lens having a concave surface directed to the object field side and substantially identical to said third lens;
a fifth negative lens having a concave surface directed to the object field side and substantially identical to said second lens; and
a sixth positive lens having a concave surface directed to the object field side and substantially identical to said first lens, each of said first through sixth lenses being a meniscus lens, whereby said lens system is structured to satisfy the following conditions:

$$0.28 < \frac{d_1 + d_2 + d_3}{z} < 0.34$$

$$0.7 < \frac{r_2}{r_3} < 1.2$$

$$-17 < \frac{f_{12}}{f} < -4.5$$

$1.7 < n_1 < 1.8$
$v_2 < 35$
$1.68 < n_3 < 1.73$
$50 < v_3$ where,
f: combined focal distance of the entire system;
$f_{12}$: combined focal distance of the first (=sixth) and the second (=fifth) lenses;
$r_2$: radius of curvature of a second surface (=eleventh surface) from the object field side;
$r_3$: radius of curvature of a third surface (=tenth surface) from the object field side;
$d_1 + d_2 + d_3$: sum of the center lens thicknesses of the first lens (=sixth lens) and the second lens (=fifth lens) and the center air gap between the first (=sixt) and second (=fifth) lenses;
z: total sum of the center lens thicknesses of the entire system;
$n_1$: refractive index of the first (=sixth) lens;
$v_2$: Abbe number of the second (=fifth) lens;
$n_3$: refractive index of the third (=fourth) lens:
$v_3$: Abbe number of the third (=fourth) lens.

* * * * *